9170X
D. Richmond,
Coffee Mill.
Patented Oct. 14. 1835.
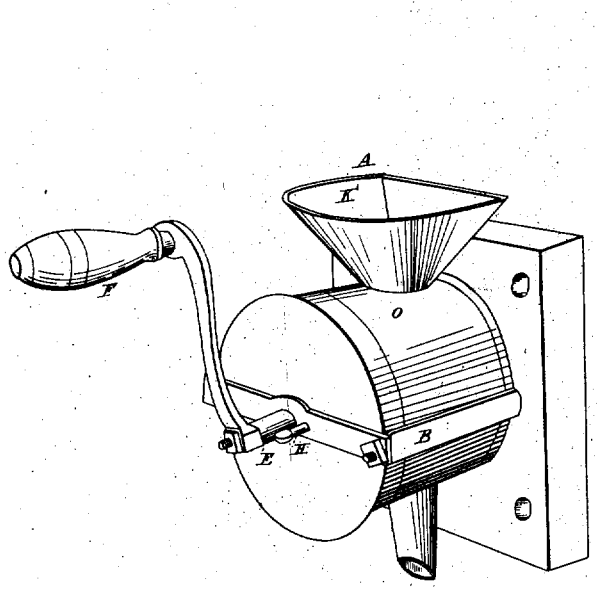
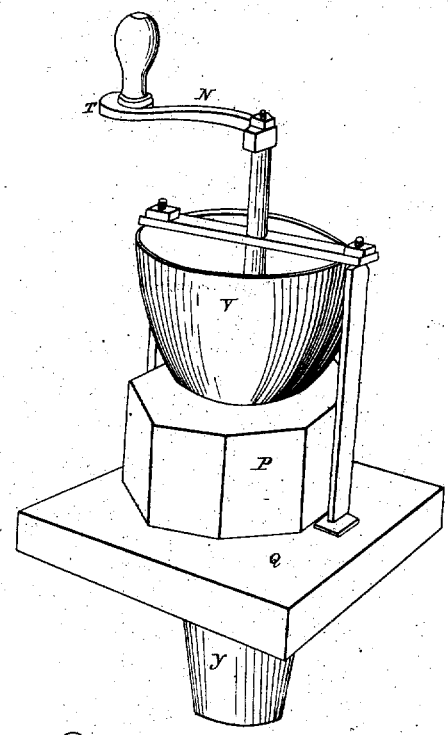
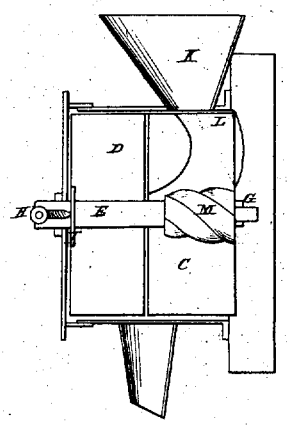
Sectional View
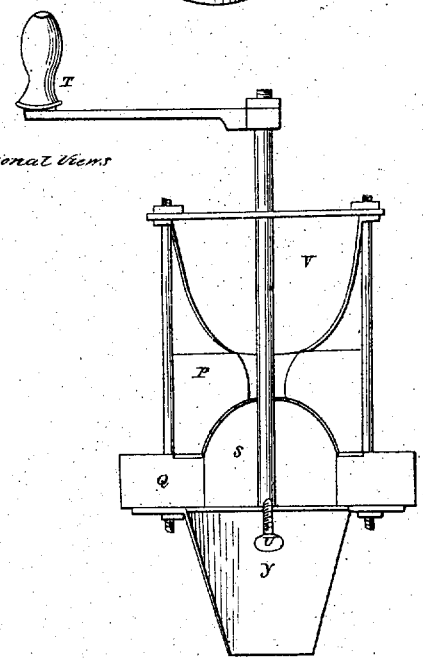

9179X Oct. 14. 1835

David Richmond of Mc Arthurstown, Athens County, Ohio,

The Schedule referred to in these Letters Patent and making part of the same containing a description in the words of the said David Richmond himself of his improvement in the mill for Grinding Coffee, Pepper, and other Spices —

Be it known that I, David Richmond of Mc Arthurstown, Athens County, State of Ohio, have made a new and useful improvement in the useful arts; being a burr stone Coffee Mill which is described as follows, reference being had to the annexed drawings making part of this Specification —

A. Is a perspective view of One combination of Mill. — shewing the parts put together and bearing some resemblance to the common Grist Mill —

B. The frame composed of four pieces or bars of iron which support the Stones &c. —

C. The bed Stone let into the block at the end of the frame about 1/4th of an inch —

D. The runner made of the raccoon or other suitable burrstone about 6 inches diam. and 3 inches thick secured to the spindle E. on the end of which is a crank. handle F. by which it is turned in a vertical position; the other end of the spindle turns in a cavity in the bar G. of the frame —

H. a set screw. to regulate the distance apart of the runner and bed and bearing against a steel plate I. fastened on the spindle at the back of the runner. The mill is fed from the hopper K thro' the eye or aperture L made in the back of the bed and in the block of wood before mentioned by a worm or screw M on the end of the spindle. The ground Coffee falls from the lower side of the mill and is conducted by a spout into a receiver below. This mill may be operated in a horizontal position and fed thro' the eye of the runner or thro' the bed stone. The whole is—

91170X surrounded by a sheet iron case or covering O.

N. Is a perspective view of another combination of burr stone mill for grinding Coffee and which bears some resemblance to the conical cast iron Mill P. The bed made of burr stone of a hollow conical shape secured to the block of wood Q: having an aperture or eye R in its center thro' which the mill is fed S. the runner also made of stone of a solid conical figure fastened to and turned by the spindle, passing thro' its center T. the crank handle on the end of the spindle by which the runner is turned U. set screw to regulate the runner for grinding coarse or finer, which set screw passes thro' the lower bar of the frame and has a point upon which the spindle turns in a cavity in its lower end. This mill is operated in a horizontal position and is fed from a hopper V. thro the eye R. The ground Coffee after passing from the runner and bed is conducted to the receiver below by a circular spout Y. surrounding the bottom of the runner.

The bed and runner of these Mills may be made of any suitable stone and of any dimensions required and may turned by hand or other power, either horizontally or vertically, and may be used for grinding Pepper and spices as well as Coffee.

For a farther illustration of my invention I refer to the model of the same deposited in the Patent office,

What I claim as my invention and for which I solicit Letters Patent consists in making the bed and runner in Mills of burr or other stone instead of iron, for grinding Coffee, Pepper and spices as before specified and described.

Witnesses
Sgd. Wm P. Elliott
[illegible] C. H. W. Wharton

David Richmonde (728 w 8)

Patented 11th October 1835.

(Drawing)